(12) United States Patent
Mann

(10) Patent No.: US 6,421,997 B1
(45) Date of Patent: Jul. 23, 2002

(54) STRAW BUNCHER

(76) Inventor: Derrick Mann, 231 Logan Crescent, Regina Saskatchewan (CA), S4S 5S8

( * ) Notice: Subject to any disclaimer, the term of this patent is extended or adjusted under 35 U.S.C. 154(b) by 0 days.

(21) Appl. No.: 09/498,717

(22) Filed: Feb. 7, 2000

(51) Int. Cl.$^7$ .............................................. A01D 76/00
(52) U.S. Cl. ......................................... 56/384; 56/396
(58) Field of Search ........................... 56/1, 14.9, 15.6, 56/15.9, 16.1, 202, 341, 361, 368, 378, 384, 386, 396, 398, 400, DIG. 14, DIG. 21; 460/905; 172/612, 643, 705; 171/19

(56) References Cited

U.S. PATENT DOCUMENTS

| | | | | |
|---|---|---|---|---|
| RE6,679 E | * | 10/1875 | Nye ............................ | 460/109 |
| 214,139 A | * | 4/1879 | Holder ........................ | 56/375 |
| 497,172 A | * | 5/1893 | Fischer ....................... | 56/396 |
| 946,480 A | * | 1/1910 | Allison ....................... | 56/361 |
| 2,228,699 A | * | 1/1941 | Gledhill ...................... | 278/41 |
| 2,645,891 A | * | 7/1953 | Berkley ...................... | 56/10.9 |
| 2,662,363 A | * | 12/1953 | Worden ...................... | 56/384 |
| 3,438,183 A | * | 4/1969 | Puretic ....................... | 56/16.1 |
| 4,510,742 A | * | 4/1985 | Lypka ......................... | 56/384 |
| 4,893,682 A | * | 1/1990 | Smallacombe .............. | 172/311 |
| 5,459,987 A | * | 10/1995 | Hining et al. ................ | 56/366 |
| 5,477,667 A | * | 12/1995 | Bryant ........................ | 56/400.06 |

* cited by examiner

Primary Examiner—Thomas B. Will
Assistant Examiner—Meredith C Petravick
(74) Attorney, Agent, or Firm—Adrian D. Battison

(57) ABSTRACT

A straw buncher is provided for collecting straw in bunches when towed across a field and for releasing the straw at desired locations into large piles. The straw buncher includes a hitch for connecting to a towing implement and a frame extending generally upward and rearward therefrom for maximizing ground clearance. The frame is supported on a pair of wheels. A basket is pivotally mounted on a rear end of the frame. The basket includes a pair of side collecting members and a rear collecting member extending therebetween. The collecting members are in the form of mesh sheets extending generally upright from the ground. The rear collecting member is spaced upward from the ground and includes a plurality of ground engaging tines extending downward from a bottom end for turning up the straw from the soil such that it may be collected by the collecting members. Hydraulics are provided for raising the basket relative to the frame for releasing the collected straw.

15 Claims, 5 Drawing Sheets

STRAW BUNCHER

FIELD OF THE INVENTION

This invention relates to an implement for bunching straw on the ground into piles and more particularly to a straw buncher having a plurality of ground engaging tines for collecting the straw and a basket for containing the collected straw.

BACKGROUND

When harvesting flax straw in particular, on a continuous cropping farm there becomes a problem with the straw that has gone through the combine. Flax straw is very tough and will not break down in time for the next years seeding. Seeding is impossible with flax straw left in the field because it becomes caught and tangled in the seeding implement. The use of implements is known for collecting and piling flax straw.

U.S. Pat. No. 4,510,742 to Lypka describes a flax straw buncher having an open frame supported on wheels and arranged to be towed behind a combine. The flax straw buncher includes a rake extending transversely to the towing direction having a plurality of ground engaging tines for gathering straw. The frame however, is very low to the ground providing little clearance over straw which may already be partially piled in a heap or in a row. The rake is limited in the amount of straw which can be gathered as the straw is not prevented from being pushed over the rake or around the sides of the rake thus leaving bits of straw strewn about as the buncher passes over the ground when large amounts of straw are collected.

SUMMARY

According to one aspect of the present invention there is provided a straw buncher comprising;

a frame being supported on a pair of wheels;

a hitch mounted on a forward end of the frame; and a basket pivotally mounted on a rear end of the frame, the basket comprising:

a pair of side collecting members extending rearward from respective sides of the frame, the side collecting members being positioned adjacent to the ground so as to extend generally upward therefrom;

a rear collecting member connected between respective rear ends of the side collecting members, the rear collecting member being positioned spaced upwardly from the ground; and a plurality of tines extending generally downward from a bottom end of the rear collecting member for engaging the ground;

the basket being pivotal relative to the frame such that the basket may be raised upwardly from the ground to a transport position spaced from the ground for releasing straw which has collected in the basket into a pile on the ground.

The rear and side collecting members each preferably comprise a generally upright sheet of wire mesh, the sheets of wire mesh having first wires extending in a first direction and second wires extending in a second direction transversely to the first direction for collecting straw while permitting small debris to pass therethrough.

The rear collecting member may comprise a pair of upright inclined portions extending rearwardly and inwardly from the respective side collecting members to respective inner ends spaced from each other and an upright central portion connected between the inner ends of the upright inclined portions.

The plurality of tines preferably extend downward from the bottom end of the rear collecting member at a forward incline towards the hitch.

There may be provided a rear mounting bar mounted along the bottom end of rear collecting member, the rear mounting bar mounting the plurality of tines thereon. When using the rear mounting bar he rear mounting bar is selectively separable from the rear collecting member such that the tines may be removed and replaced.

There may be provided a slider bar mounted along a bottom side of each side collecting member, the slider bar being arranged to engage the ground for sliding movement thereon when the buncher displaced in the forward direction.

Preferably a pair of hydraulic piston cylinders are mounted on the frame, each hydraulic piston cylinder being connected to the basket for pivotal movement of the basket in response to extension and retraction of the hydraulic piston cylinder. Each hydraulic piston cylinder is preferably mounted on a top side of the frame above a corresponding one of the wheels such that the hydraulic piston cylinder is shielded from any debris on the ground.

There may be provided at least one connecting member pivotally mounted on the frame at a first end and being arranged to mount on the basket in the transport position at a second end for securing the basket in the transport position.

Preferably there is provided adjustable mounting means mounting the frame on the hitch at numerous relative heights therebetween such that the hitch may be coupled to various towing vehicles.

There may be provided an upper collecting member extending upward from the rear collecting member above the frame and side collecting members for ensuring that no straw will spill over the top of the basket as the straw is collected.

According to a further aspect of the present invention there is provided a straw buncher comprising;

a hitch arranged to connect to a towing vehicle;

a frame comprising:

a pair of hitch members mounted at first ends on the hitch so as to extend rearward and outward therefrom to respective second ends spaced from each other, each hitch member being at an upward incline from the first end to the second end; and a pair of side members extending rearward from the respective second ends of the hitch members;

a pair of wheels mounted below the respective side members of the frame, oriented for movement in a forward direction; and a basket pivotally mounted on a rear end of the respective side members, the basket comprising a generally U-shaped collecting member and a plurality of tines extending downward therefrom for engaging the ground;

the basket being pivotal relative to the frame such that the basket may be raised upwardly from the ground to a transport position spaced from the ground for releasing straw which has collected in the basket into a pile on the ground.

A crossbar may be mounted between the second ends of the hitch members for added structural support.

A pair of wheel support members is preferably mounted on respective side members so as to extend downward therefrom, each wheel support member mounting one of the wheels thereon such that the frame is supported above the wheels for further spacing the frame upward from the ground.

The basket preferably comprises:
  a pair of side collecting members extending rearward from respective sides of the frame, the side collecting members being positioned adjacent to the ground so as to extend generally upward therefrom;
  a rear collecting member connected between respective rear ends of the side collecting members, the rear collecting member being positioned spaced upwardly from the ground; and
  a plurality of tines extending generally downward from a bottom end of the rear collecting member for engaging the ground.

BRIEF DESCRIPTION OF THE DRAWINGS

In the accompanying drawings, which illustrate an exemplary embodiment of the present invention.

DETAILED DESCRIPTION

Figure 1:
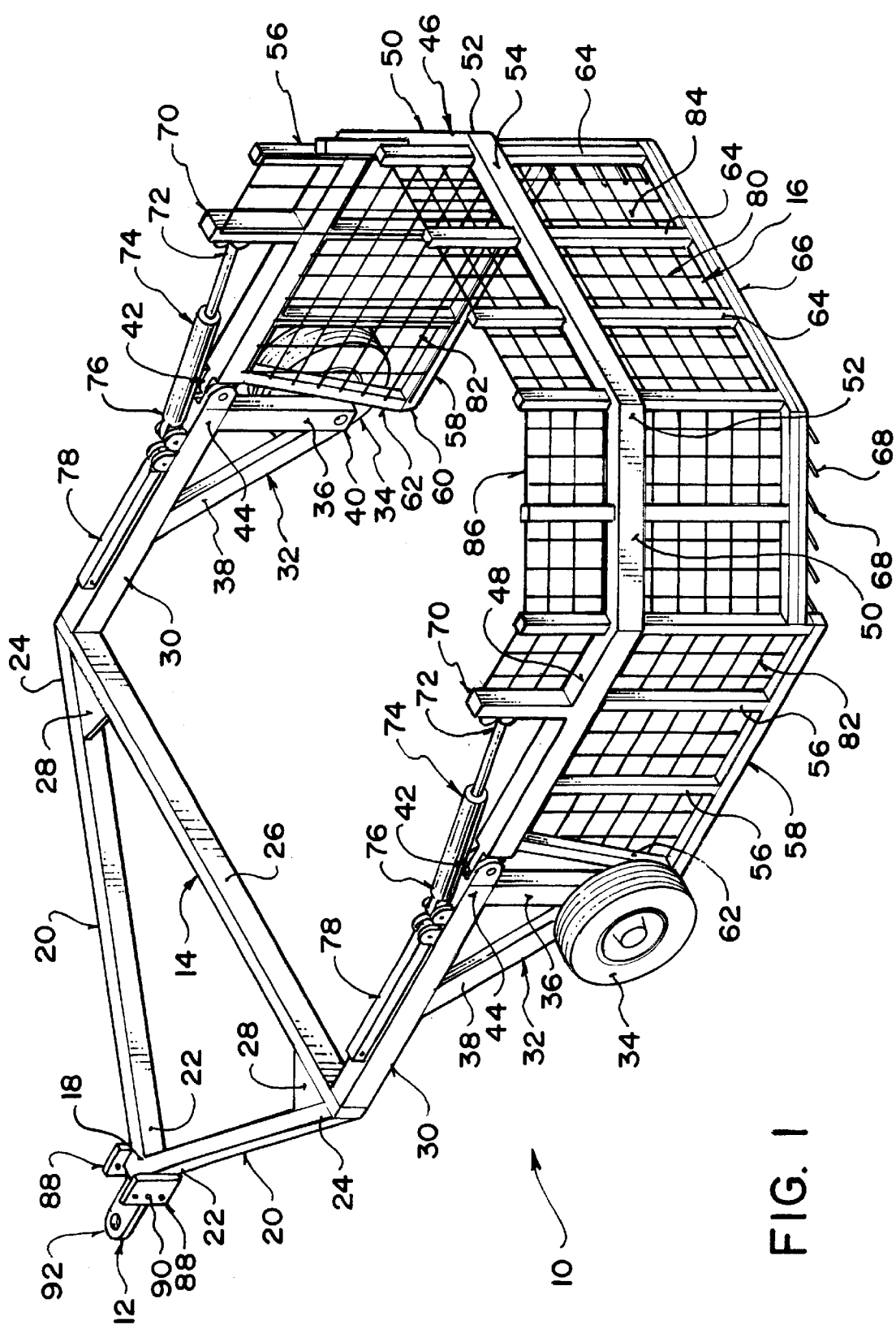
FIG. 1 is an isometric view showing the rear end and one side of the straw buncher from above.
Figure 2:
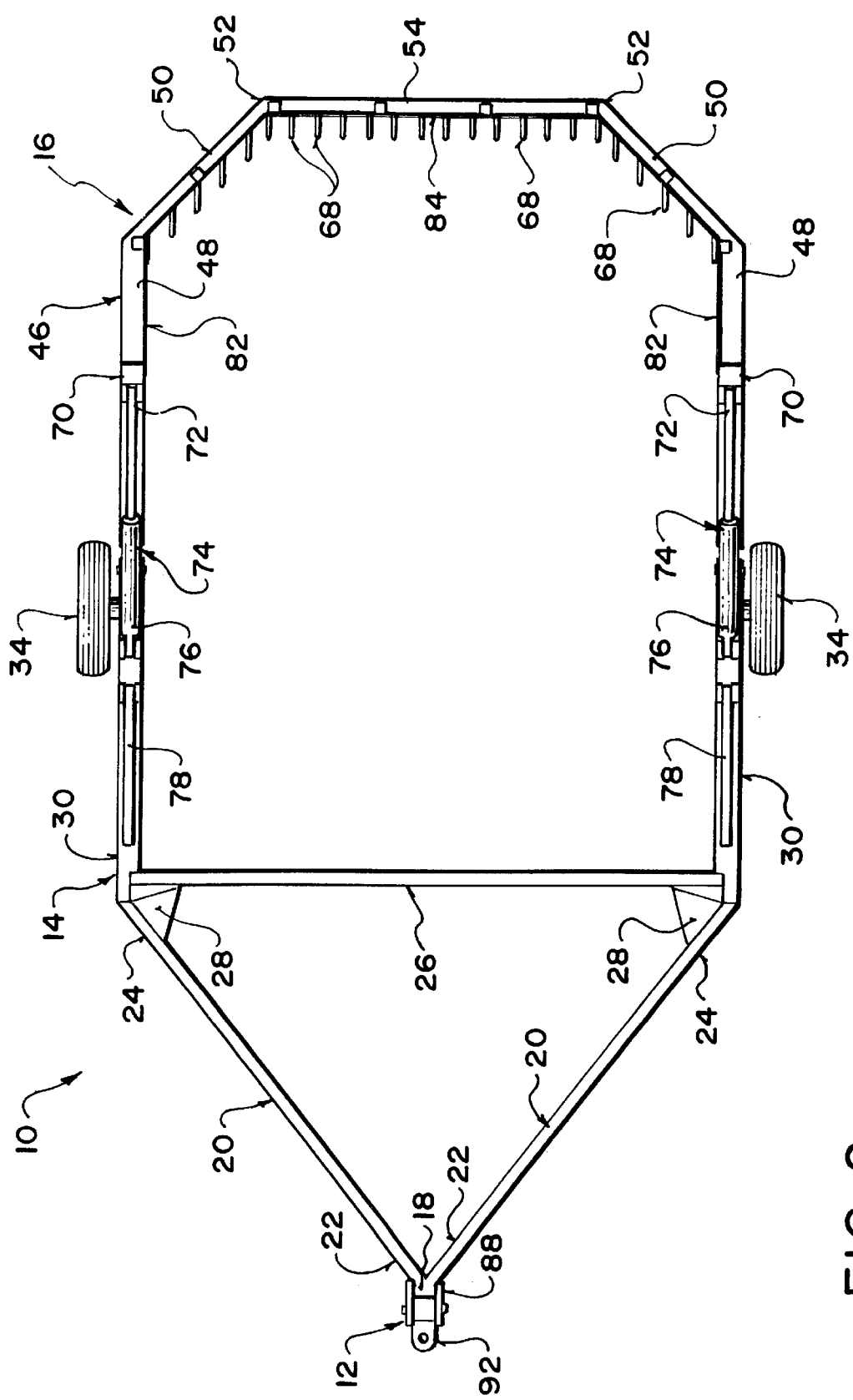
FIG. 2 is a top plan view of the straw buncher.
Figure 3:
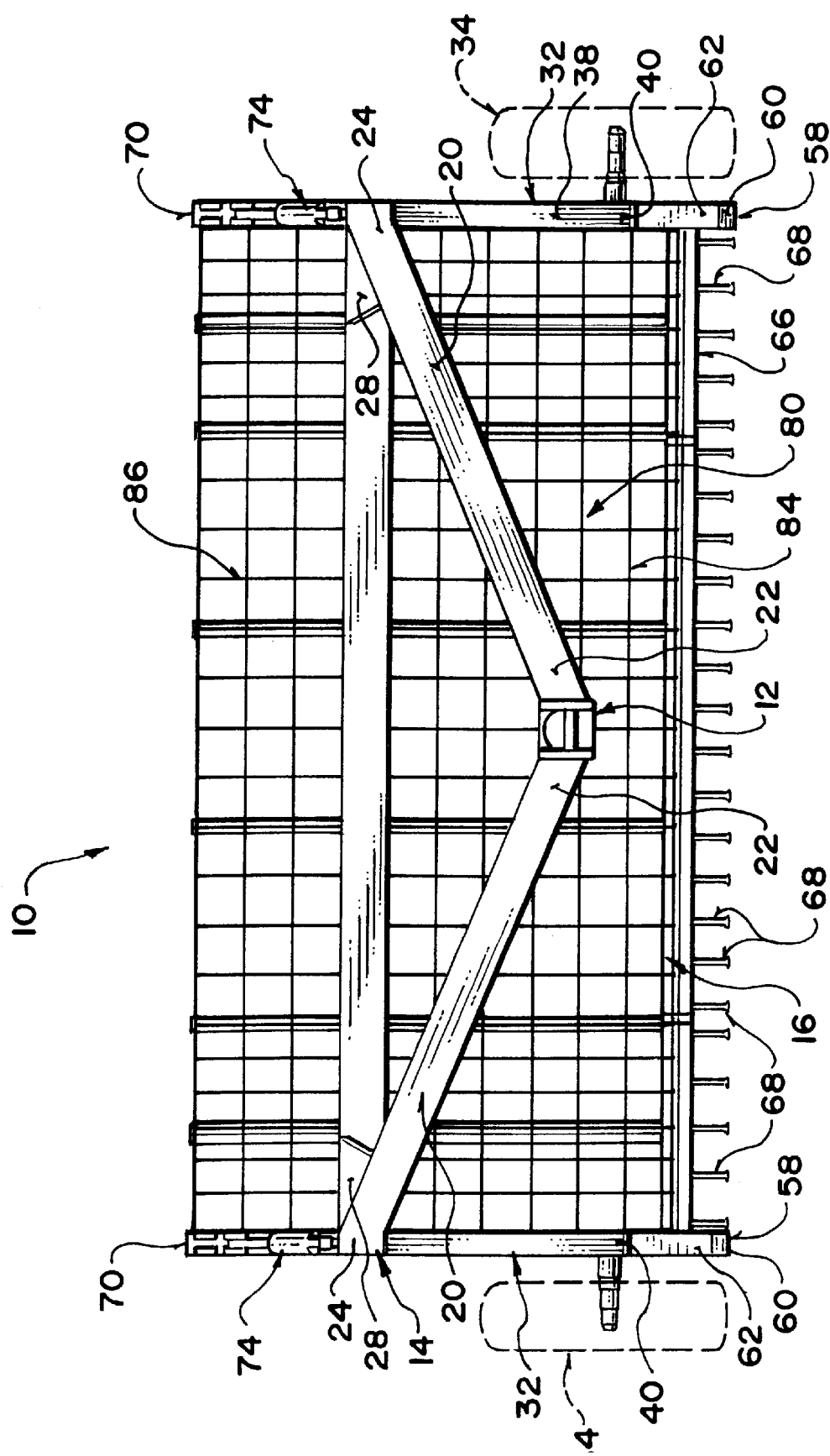
FIG. 3 is a front elevational view of the straw buncher.

Referring to the accompanying drawings, there is illustrated a straw buncher generally indicated by reference numeral 10. The straw buncher 10 is intended for use with a tractor or combine for towing the straw buncher across a field having broken straw bits thereon. The straw buncher 10 is arranged to collect the straw into a large pile and then release the pile at a desired location on the field.

The straw buncher 10 generally includes a hitch 12 for connecting to a towing vehicle, a main frame 14 arranged to be towed behind the towing vehicle and a basket 16 mounted on the frame 14 for collecting the straw.

The main frame 14 mounts the hitch 12 on a front end 18. A pair of hitch members 20 extend rearward and outward from respective first ends 22 connected to the hitch to respective second ends 24 spaced apart from each other. The hitch members 20 extend at an upward incline from the first end to the second end to maximise the allowable clearance space thereunder.

A crossbar 26 connects between the second ends 24 of the hitch members. A gusset 28 is mounted at each end of the crossbar 26 for providing added structural support to the frame.

The main frame 14 also includes a pair of side members 30 extending rearward from respective second ends of the hitch members. The side members 30 are parallel to each other and extend generally horizontally spaced upward from the ground.

A pair of wheel supports 32 are mounted on respective bottom sides of the side members, each for mounting a wheel 34 thereon. The wheel supports 32 each include an upright member 36 extending downward from the corresponding side member and a bracing member 38 connecting between the side member and a bottom end 40 of the upright member. A spindle extending from the bottom end 40 supports the wheel thereon. The spindle is a universal type spindle which can accommodate various wheel attachments thereon. The wheel supports 32 are arranged so as to support the main frame 14 up above the wheels for maximising the clearance under the frame. The frame members are all steel members of rectangular cross section which are welded together.

A pivot 42 is mounted on a rear end 44 of each side member for mounting the basket 16 thereon. The basket 16 includes a secondary frame 46 having a pair of side bars 48 extending rearward from the respective pivots 42. A pair of inclined bars 50 are mounted on a rearward end of the side bars 48 and arranged to extend rearward and inward therefrom to an inner end 52. The inner ends 52 are spaced apart such that a rear bar 54 is mounted therebetween. The rear bar 52 is perpendicular to and centered between the side bars 48.

A plurality of spaced apart upright supports 56 extend downward from the side bars 48 to respective slider bars 58 mounted on a bottom end thereof. The slider bars 58 are runners positioned adjacent the ground for sliding movement thereon when the straw buncher is towed in a forward direction along the ground. The slider bars 58 are oriented for travel in the forward direction.

A forward end 60 of each slider bar 58 extends forward past the pivots 42 such that a forward upright support 62 extends upward at a rearward incline to mount on the corresponding side bar 48.

A plurality of spaced apart upright supports 64 extend downward from the rear and inclined bars 54 and 50 to a rear mounting bar 66. The rear mounting bar 66 is shaped similarly to the arrangement of the rear and inclined bars, being parallel to and spaced below the rear and inclined bars. The rear mounting bar 66 extends horizontally along the ground spaced upwardly therefrom. A plurality of tines 68 are mounted spaced apart along the rear mounting bar 66. The tines 68 are arranged to extend downward at a forward incline for engaging the ground and turning up the soil just enough to aid in the collection of straw on the ground. The rear mounting bar is removably mounted on the upright supports 64 using bolts or other similar fasteners such that the rear mounting bar may be disconnected and replaced. The tines 68 may thus be replaced with new tines or different variations of pick up implements.

A post 70 is mounted on each side bar 48 spaced towards the rear end and arranged to extend upward therefrom. A piston end 72 of a hydraulic piston cylinder 74 is pivotally mounted on each post 70 near a top end of the post. A cylinder end 76 of each hydraulic piston cylinder 74 is mounted on the corresponding side member 30 near the rear end 44.

Figure 4:
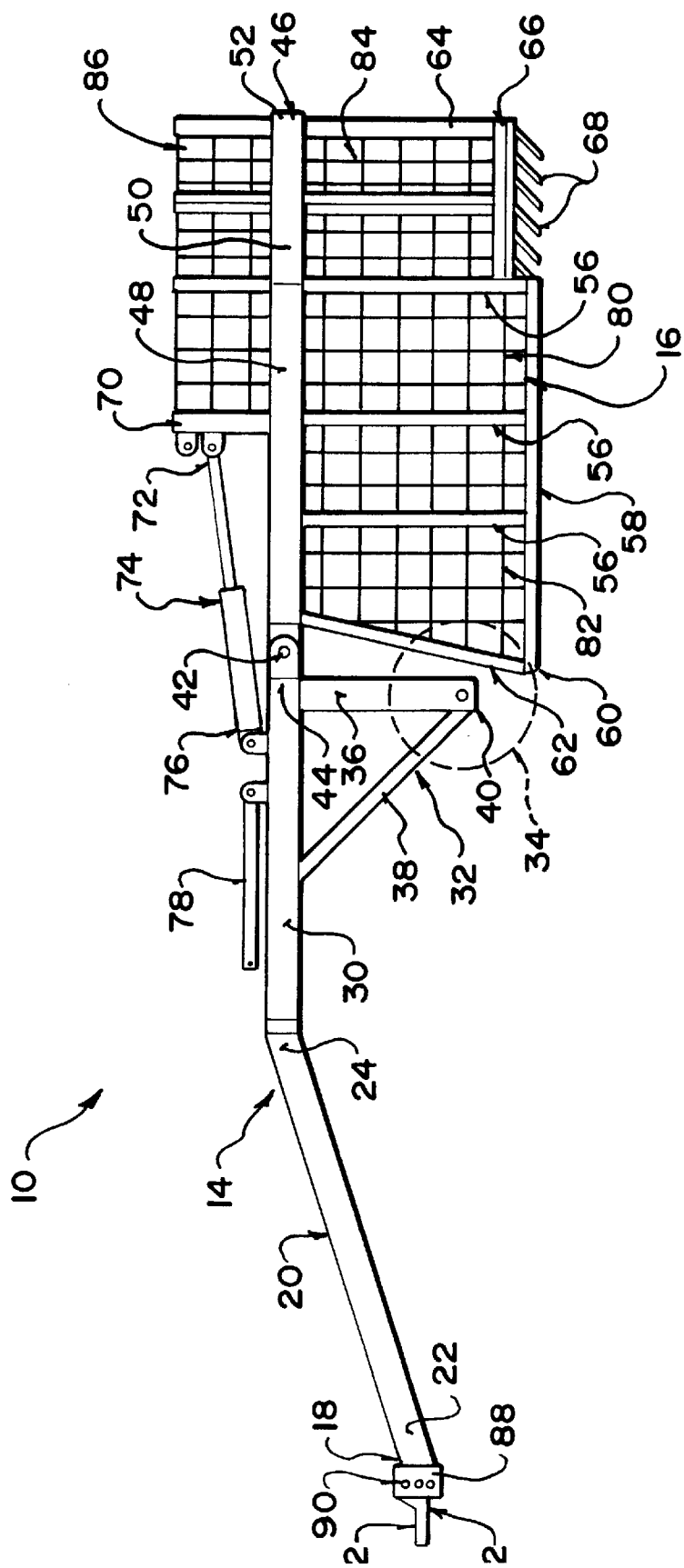
FIG. 4 is a side elevational view of the straw buncher shown in a field position.
Figure 5:
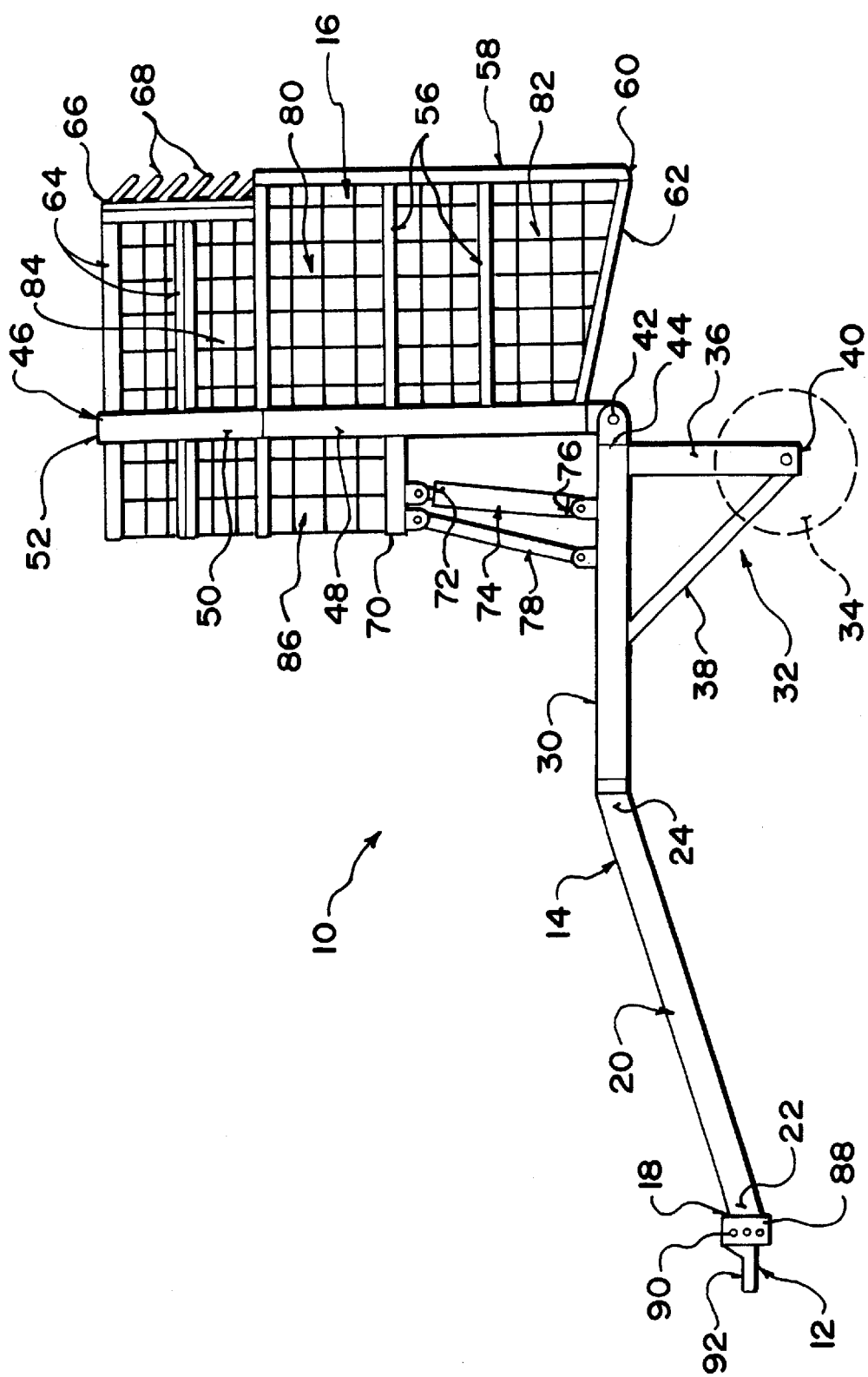
FIG. 5 is a side elevational view of the straw buncher shown in a transport position.

When the hydraulic piston cylinders 74 are extended the straw buncher appears as shown in FIG. 4 with the basket extending rearward from the frame for use in collecting straw in a field position. Contraction of the hydraulic piston cylinders 74 will pivot the basket upward into a transport position as shown in FIG. 5 wherein the basket extends upward from the rear end of the frame. In the transport position of FIG. 5 the basket the side bars extend vertically upward for maximising the clearance below the rear mounting bar such that a large pile may be released. By positioning the basket over the frame in the transport position, the straw buncher is compacted for ease of manoeuvrability.

When mounted in the transport position as shown in FIG. 5, the buncher is supported entirely on the hitch and the two wheels. To further secure the basket in the transport position in case of faulty hydraulics or other, a pair of connecting members 78 are provided. The connecting members 78 are pivotally mounted on the respective side members 30 at a first end forward of the hydraulic piston cylinder mounting. The connecting members 78 extend rearward and upward for mounting on the top end of the respective posts 70 at a second end. When it is desirable to use the straw buncher in the field position, the second end of the connecting members 78 are disconnected and the connecting members are pivoted forward until they are positioned horizontally along the top side of the respective side members. The hydraulic piston cylinders may then be extended for lowering the basket into the field position.

When the straw buncher is towed across a field in the field position, the tines pull up loose pieces of straw from the ground. The straw is then gathered in the basket 16. The basket includes a mesh sheet 80 which extends across an inner face of the secondary frame 46. The mesh sheet 80 includes a plurality of horizontal wires and a plurality of vertical wires woven therethrough for gathering various size bits of straw oriented in any number of directions. The mesh sheet 80 includes side collecting portions 82 extending between the side bars and the respective slider bars. The mesh sheet also includes a rear collecting portion 84 extending from the rear and inclined bars to the rear mounting bar. An extended portion 86 extends upward from the rear collecting portion between the posts 70 for containing any spill over of collected straw over the top of the basket.

The hitch 12 is an adjustable type hitch which can accommodate various heights of towing vehicles. The hitch includes a pair of upright, spaced apart and parallel plates 88 extending forward from the front end 18 of the frame. A plurality of co-operating apertures 90 extend through the pair of plates for inserting a locking pin therethrough such that a receiving portion 92 of the hitch may be mounted at various relative heights therein.

In use the straw buncher is towed across a field until a suitable sized pile of hay is collected in the basket. The basket may then be raised and the towing vehicle advanced in the forward direction for leaving the straw behind in a pile. Lowering the basket will allow the straw buncher to continue collecting straw.

While one embodiment of the present invention has been described in the foregoing, it is to be understood that other embodiments are possible within the scope of the invention. The invention is to be considered limited solely by the scope of the appended claims.

What is claimed is:

1. A straw buncher comprising;
    a frame being supported on a pair of wheels for movement in a working direction;
    a hitch mounted on a forward end of the frame; and
    a basket pivotally mounted on a rear end of the frame, the basket comprising:
        a pair of side collecting members extending rearward relative to the working direction along respective sides of the frame, the side collecting members extending from a position adjacent to the ground generally upward therefrom;
        a slider bar mounted along a bottom side of each side collecting member, the slider bar being arranged to engage the ground for sliding movement thereon as the frame moves in the working direction;
        a rear collecting member connected between respective rear ends of the side collecting members, the rear collecting member having a bottom end positioned spaced upwardly from each slider bar and thus from the ground; and
        a plurality of tines at spaced positions across the bottom end of the rear collecting member, each tine extending generally downward from the bottom end of the rear collecting member for engaging the ground;
    the basket being pivotal relative to the frame such that the basket may be raised upwardly from the ground to a transport position spaced from the ground for releasing straw which has collected in the basket into a pile on the ground.

2. The straw buncher according to claim 1 wherein the rear and side collecting members each comprise a generally upright sheet of wire mesh, the sheets of wire mesh having first wires extending in a first direction and second wires extending in a second direction transversely to the first direction for collecting straw while permitting small debris to pass therethrough.

3. The straw buncher according to claim 1 wherein the rear collecting member comprises a pair of upright inclined portions extending rearwardly and inwardly from the respective side collecting members to respective inner ends spaced from each other and an upright central portion connected between the inner ends of the upright inclined portions.

4. The straw buncher according to claim 1 wherein the plurality of tines extend downward from the bottom end of the rear collecting member at a forward incline towards the hitch.

5. The straw buncher according to claim 1 wherein there is provided a rear mounting bar mounted along the bottom end of the rear collecting member, the rear mounting bar mounting the plurality of tines thereon.

6. The straw buncher according to claim 5 wherein the rear mounting bar is selectively separable from the rear collecting member such that the tines may be removed and replaced.

7. The straw buncher according to claim 1 wherein there is provided a pair of hydraulic piston cylinders mounted on the respective side members, each hydraulic piston cylinder being connected to the basket for pivotal movement of the basket in response to extension and retraction of the hydraulic piston cylinder.

8. The straw buncher according to claim 7 wherein each hydraulic piston cylinder is mounted on a top side of the frame above a corresponding one of the wheels such that the hydraulic piston cylinder is shielded from any debris on the ground.

9. The straw buncher according to claim 1 wherein there is provided at least one connecting member pivotally mounted on the frame at a first end and being arranged to mount on the basket in the transport position at a second end for securing the basket in the transport position.

10. The straw buncher according to claim 1 wherein there is provided adjustable mounting means mounting the frame on the hitch at numerous relative heights therebetween such that the hitch may be coupled to various towing vehicles.

11. The straw buncher according to claim 1 wherein there is provided an upper collecting member extending upward from the rear collecting member above the frame and side collecting members.

12. A straw buncher comprising;
    a hitch arranged to connect to a towing vehicle;
    a frame comprising:
        a pair of hitch members mounted at first ends on the hitch so as to extend rearward and outward therefrom to respective second ends spaced from each other, each hitch member being at an upward incline from the first end to the second end; and
        a pair of side members extending rearward from the respective second ends of the hitch members;

a pair of wheels mounted below the respective side members of the frame, oriented for movement in a forward direction; and a basket pivotally mounted on a rear end of the respective side members, the basket comprising a generally U-shaped collecting member and a plurality of tines extending downward therefrom for engaging the ground;

the basket being pivotal relative to the frame such that the basket may be raised upwardly from the ground to a transport position spaced from the ground for releasing straw which has collected in the basket into a pile on the ground.

13. The straw buncher according to claim 12 wherein there is provided a crossbar mounted between the second ends of the hitch members for added structural support.

14. The straw buncher according to claim 12 wherein there is provided a pair of wheel support members mounted on respective side members so as to extend downward therefrom, each wheel support member mounting one of the wheels thereon such that the frame is supported above the wheels for further spacing the frame upward from the ground.

15. The straw buncher according to claim 12 wherein the basket comprises:

a pair of side collecting members extending rearward from respective sides of the frame, the side collecting members extending from a position adjacent to the ground generally upward therefrom;

a slider bar mounted along a bottom side of each side collecting member, the slider bar being arranged to engage the ground for sliding movement thereon as the frame moves in a working direction; and a rear collecting member connected between respective rear ends of the side collecting members, the rear collecting member having a bottom end positioned spaced upwardly from each slider bar and thus from the ground; and and wherein the plurality of tines is arranged at spaced positions across the bottom end of the rear collecting member, each tine extending generally downward from the bottom end of the rear collecting member for engaging the ground.

* * * * *